United States Patent [19]

Suzuki et al.

[11] Patent Number: 5,015,430

[45] Date of Patent: May 14, 1991

[54] METHOD FOR MANUFACTURING MAGNETIC TAPE

[75] Inventors: Akihiro Suzuki; Masaaki Sakaguchi, both of Kanagawa, Japan

[73] Assignee: Fuji Photo Film Co., Ltd., Kanagawa, Japan

[21] Appl. No.: 414,343

[22] Filed: Sep. 29, 1989

[30] Foreign Application Priority Data

Oct. 13, 1988 [JP] Japan ................. 63-255970

[51] Int. Cl.⁵ ............. G11B 5/72; G11B 5/78; B29C 53/10
[52] U.S. Cl. ................. 264/146; 264/160; 264/280; 264/294; 425/297
[58] Field of Search ........ 264/280, 146, 160, 22, 264/24, 294, 147, 162; 425/297, 106

[56] References Cited

U.S. PATENT DOCUMENTS

| | | | |
|---|---|---|---|
| 2,946,087 | 7/1960 | Haroldson et al. | 264/280 |
| 4,017,251 | 4/1977 | Coburn et al. | 425/404 |
| 4,370,291 | 1/1983 | Kazama et al. | 264/296.2 |
| 4,587,071 | 5/1986 | Minami et al. | 264/210.7 |
| 4,639,346 | 1/1987 | Pav et al. | 264/280 |
| 4,798,759 | 1/1989 | Dallman et al. | 264/299 |
| 4,861,249 | 8/1989 | Ruddell | 425/297 |

FOREIGN PATENT DOCUMENTS 47-12424 4/1972 Japan .
62-209727 9/1987 Japan .
63-133320 6/1988 Japan .

Primary Examiner—Jay H. Woo
Assistant Examiner—Khanh P. Nguyen
Attorney, Agent, or Firm—Sughrue, Mion, Zinn, Macpeak & Seas

[57] ABSTRACT

A method for efficiently manufacturing a magnetic tape in which damage to the side edges of the tape is prevented so as to prevent problems such as signal dropout. A source tape is provided having a magnetic recording layer formed thereon. The source tape is slivered to produce individual tapes of a final product width. The obverse and reverse surfaces of the individual tapes are then smoothed with a calendaring unit composed of a pair of heated work rolls and a pair of backup pressure rolls, and finally the individual magnetic tapes are wound on long rolls.

8 Claims, 2 Drawing Sheets

METHOD FOR MANUFACTURING MAGNETIC TAPE

BACKGROUND OF THE INVENTION

The present invention relates to a magnetic tape manufacturing method, particularly to a magnetic tape manufacturing method including a step of smoothing the obverse and reverse surfaces of a magnetic tape.

In a conventional method for manufacturing a magnetic tape, a magnetic liquid is applied to a nonmagnetic carrier of larger width than that of the final tape product to form a magnetic recording layer on the carrier. After the magnetic layer has been subjected to orientation and other required processing, the layer is dried. The surface of the magnetic layer is thereafter smoothed to thereby form a source tape. The source tape is then slivered into prescribed widths of the final magnetic tape.

The smoothing of the surface of the magnetic layer is performed in order to luster the surface, enhance the packing density of the layer, and make uniform the thickness thereof. For this purpose, for example, a pushing force of about 200 to 300 kg/cm may be applied to the carrier and the magnetic layer by a plurality of calendar rolls. The carrier and the magnetic layer may be heated to a temperature of about 60° C. to 100° C. by a heating procedure such as induction heating or hot water heating while the tapes are wound on rolls so that the magnetic layers are softened prior to having their surfaces smoothed. However, since the source tape is slivered after the surface of the magnetic layer on the carrier of the tape has been smoothed, the surface conditions of the magnetic tape cut from the source tape are disturbed at both side edges of the magnetic tape. This can lead to problems such as signal dropout, fluctuations in the audio level of the recorded and reproduced signal, and clinging of magnetic grains dislodged from the magnetic layer to the recording/playback head.

In order to solve this problem, a method has been employed in which surface portions of a magnetic tape slivered from a source tape are smoothed only at and near the side edges of the back coating layer of the tape to thereby increase the strength of the applied film. Such a method has been disclosed in Japanese Unexamined Published Patent Application No. 209727/87. Another conventional method in which a layer is composed of a polishing agent and a lubricant is coated on the side edges of a magnetic tape slivered from a source tape. An example of this method is disclosed in Japanese Unexamined Published Patent Application No. 133320/88. In accordance with yet another conventional method, the side edges of a magnetic tape slivered from a source tape are processed with an organic solvent. Such a method is disclosed in Japanese Patent Application No. 12424/72.

However, in the conventional method disclosed in Japanese Unexamined Published Patent Application No. 209727/87, it is difficult to perform the smoothing of the surface of the magnetic tape because the area to be smoothed is narrow. Moreover, since the surface of the magnetic layer of the source tape is smoothed before the slivering thereof and the surface of the back coating layer of the magnetic tape is smoothed after the slivering of the source tape, the manufacturing efficiency of the magnetic tape is not good.

In each of the other conventional methods disclosed in Japanese Unexamined Published Patent Application No. 133320/88 and Japanese Patent Application No. 12424/72, a plurality of processing steps are required after slivering, and hence the total number of manufacturing steps is high, which increases the cost of manufacturing.

SUMMARY OF THE INVENTION

The present invention was made in order to solve the above-described problems. Accordingly, it is an object of the present invention to provide a method for manufacturing a magnetic tape in which the surface of the tape is prevented from being damaged at the side edges thereof so as to prevent problems such as signal dropout and to improve the manufacturing efficiency of the tape.

In the method provided according to the present invention, a magnetic liquid is applied to a nonmagnetic carrier so that a magnetic layer is formed thereon. The method is characterized in that a source tape composed of the nonmagnetic carrier and the magnetic layer is slivered to form magnetic, tapes of a prescribed width with the obverse and reverse surfaces of the magnetic tape being smoothed before the magnetic tape is wound. Since the obverse and reverse surfaces of the magnetic tape are smoothed after the slivering of the source tape, the strength of the coating layer of the tape is increased at both side edges thereof. Also, because the slivering step and the smoothing step are performed sequentially, the manufacturing efficiency of the magnetic tape is improved.

DESCRIPTION OF THE PREFERRED EMBODIMENTS

Preferred embodiments of the present invention are hereafter described in detail with reference to the attached drawings.

Figure 1:
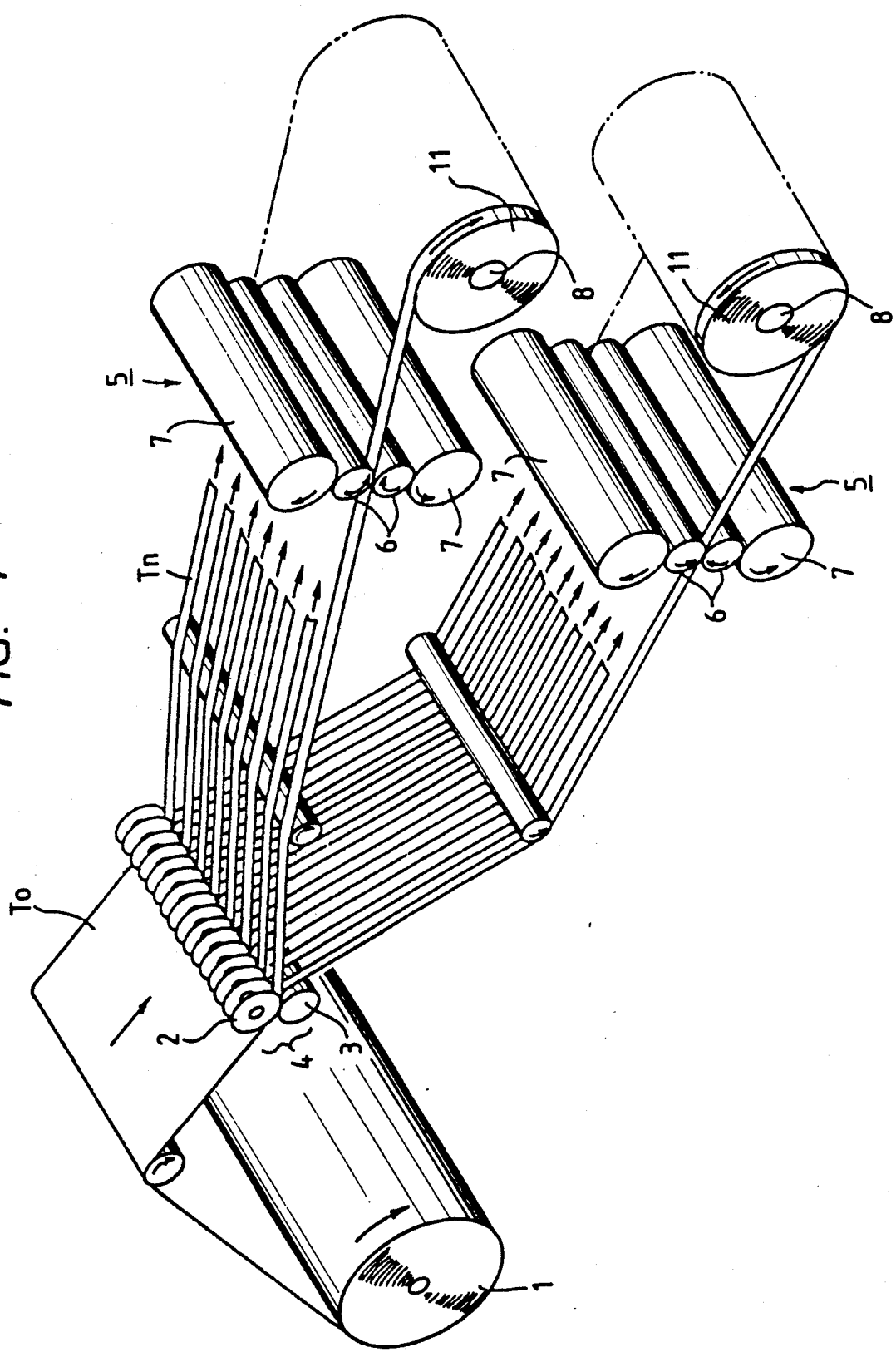
FIG. 1 is a perspective schematic view of an apparatus for manufacturing a magnetic tape in accordance with the present invention.

FIG. 1 is a perspective schematic view of an apparatus for manufacturing a plurality (n) of magnetic tapes Tn, each having a prescribed width, in accordance with a preferred embodiment of a method of the invention. In this method, a step of slivering the plural magnetic tapes Tn from a source tape To larger in width than the final magnetic tape and a step of smoothing the surfaces of the magnetic tapes are sequentially performed in that order. That is, after the source tape To, which usually has a width of 300 mm to 2,000 mm, is pulled from a supply roll 1, a slivering unit 4 composed of upper circular cutters 2 and lower circular cutters 3 slivers the moving source tape to produce the magnetic tapes Tn, the width of each of which is usually 3.8 mm to 50.8 mm. The paths for the magnetic tapes Tn are alternately displaced from each other so that mutually adjacent tapes are prevented from overlapping should any meandering occur. Each of the two groups of magnetic tapes Tn is conveyed to a calendaring unit 5 where the surfaces of the magnetic tapes are simultaneously smoothed. Th calendaring unit 5 includes a pair of work rolls 6. The tapes are pressed under the forces of the backup rolls 7 while the tapes are heated by a heating device provided in the work rolls 6. The entirety of the outside surfaces of the magnetic layers of the magnetic tapes Tn are thus smoothed. The magnetic tapes Tn are then wound as n long rolls 11 on winding shafts 8.

Although there may be some damage to the surfaces of the magnetic tapes Tn at and near the side edges of the tapes due to the slivering operation performed by the slivering unit 4, any such damage is corrected by the smoothing of the surfaces. Moreover, the strength of the coating layers of the magnetic tapes at the side edges is increased by the smoothing operation so that the side edges are made resistant to wear and cracking. Since any damage to the surfaces of the magnetic tapes Tn at and near the side edges is corrected by the smoothing operation, no further step of correcting the slivering damage is required after smoothing. Therefore, the total time required for manufacturing the magnetic tapes Tn is shortened.

Figure 2:
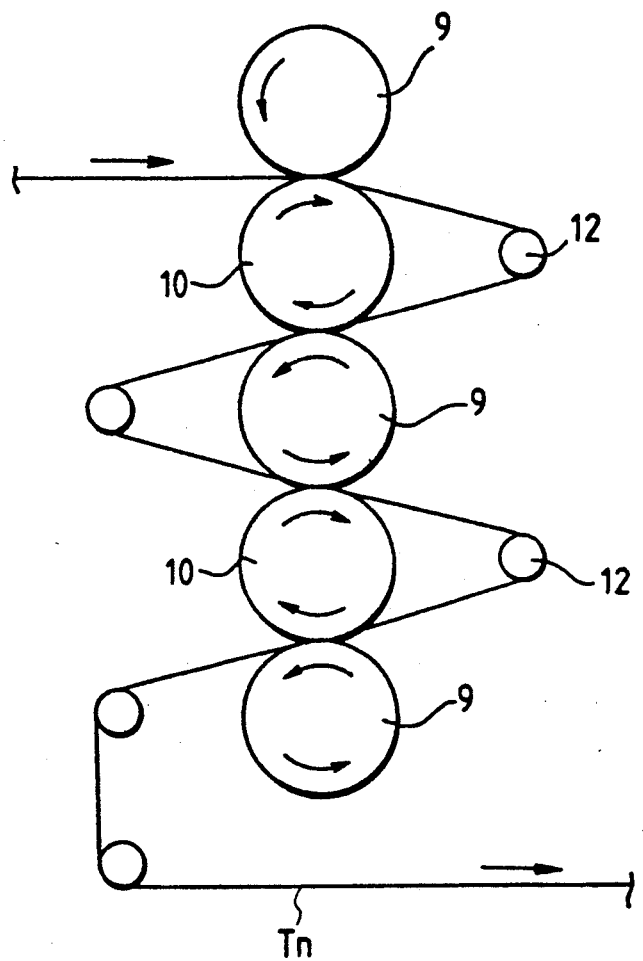
FIG. 2 is a sectional view of a calendaring unit which may be used in the practice of the invention.

The present invention is not limited to the above-described embodiment, but may be embodied or practiced in various other ways without departing from the spirit or essential character thereof. For example, each calendaring unit 5 may be composed of only a pair of metal or ceramic rolls, or composed of a plurality of alternately stacked metal rolls 9 and elastic rolls 10 so as to move the magnetic tapes Tn between the rolls while turning the tapes around spacer rolls 12, as shown in FIG. 2. Before the magnetic tapes Tn slivered from the source tape To are wound as the long rolls 11, the magnetic tapes may be subjected to various other types of processing such as polishing the magnetic layers of the tapes by polishing rolls, hard blades or the like prior to smoothing, so as to shorten the total processing time of the tapes.

In a magnetic tape manufacturing method provided according to the present invention, a source tape having a magnetic layer is slivered into magnetic tapes each having a prescribed width, and the entire obverse and reverse surfaces of the magnetic tapes are then smoothed before the individual magnetic tapes are wound up. The steps of slivering and smoothing are sequentially performed to reduce the total number of steps so as to improve the manufacturing efficiency. Since the surfaces of the magnetic tapes are smoothed, any damage to the surfaces thereof at and near the side edges of the tapes caused by the slivering is corrected, and the strength of the coating layers of the tapes is increased. As a result, problems such as clinging of magnetic grains dislodged due to slivering to the recording/playback head, and wear of the side edges of the tapes during the running thereof are avoided so that signal dropout, fluctuations in the audio level of the recorded and reproduced signals, and the like are prevented. Also, the manufacturing efficiency of the magnetic tapes is improved, thus reducing the cost of manufacturing, and the quality and reliability of the tapes are improved.

An actual example of the present invention will no be described to clarify the effects of the invention, in comparison with a comparative example produced according to a conventional method.

ACTUAL EXAMPLE

A magnetic liquid having a composition as indicated in Table 1 below was applied in an amount of 25 cc/m$^2$ to a polyethylene terephthalate carrier having a thickness of 15 μm and a width of 300 mm. The layer was then subjected to orientation and drying to produce a source tape. The source tape was slivered, at a speed of 200 m/min, to produce magnetic tapes each having a width of 12.7 mm (0.5 inch). The magnetic tapes were moved through a calendaring unit composed of three metal rolls and two elastic rolls which were alternately stacked on each other as shown in FIG. 2 so that the surfaces of the magnetic tapes were smoothed. At that time, the line pressure of the calendaring unit on the magnetic tapes and the heating temperature of the unit were 200 kg/cm and 80° C., respectively.

TABLE 1

| Composition of liquid: | |
|---|---|
| Magnetic substance (cobalt-containing γ-Fe$_2$O$_3$) | 300 parts by weight |
| Nitrocellulose (RS1/2) | 30 parts by weight |
| Polyol | 30 parts by weight |
| Polyisocyanata | 25 parts by weight |
| Carbon black | 15 parts by weight |
| Polishing agent (Cr$_2$O$_3$) | 3 parts by weight |
| Myristic acid | 1.5 parts by weight |
| Silicone oil | 1.0 parts by weight |
| Methyl ethyl ketone and cyclohexanone at weight ratio of 6:4 | 750 parts by weight |

Each of the magnetic tapes was employed in a VHS-format video cassette. The number of signal dropouts, the incidence of audio level fluctuation, and the amount of clinging of magnetic grains to the recording/playback head were measured. The number of signal dropouts per minute was measured with the use of a VHS-format video cassette recorder model no. AG6800 manufactured by Matsushita Electric Industrial Co. and a dropout counter model no. VD-3M manufactured by Japan Victor Co. Each signal dropout was such that the fall in output level was −20 dB or more and lasted for 15 microseconds or more. As for the incidence of audio level fluctuation, a prescribed reference signal of 7 kHz was recorded in the audio track of each of the magnetic tapes with the use of the VHS-format video cassette recorder and then reproduced while the incidence of audio level drop by −10 dB or more was measured. To determine the incidence of clinging of magnetic grains to the head, a video signal was recorded on the magnetic tape using a VHS-format video cassette recorder, and the percentage of occurrence of clinging of magnetic grains to the head of the recorder was measured. The results of these measurements are shown below.

COMPARATIVE EXAMPLE

A source tape having the same properties and dimensions as that in the Actual Example was moved through the same calendaring unit as the Actual Example so that the surface of the source tape was smoothed. Subsequently, the tape was wound and then slivered, at a speed of 200 m/min., to produce magnetic tapes having a width of 12.7 mm (0.5 inch). Each of the magnetic tapes was employed in a VHS-format video cassette. The incidence of dropouts, the incidence of audio level fluctuation, and the amount of clinging of magnetic grains to the video recording playback head was measured in the same manner as in the Actual Example. The results of these measurements are shown in Table 2.

TABLE 2

|  | No. of Dropouts | Incidence of Audio Level Fluctuation | Incidence of Clinging of Magn. Grains |
|---|---|---|---|
| Actual Example | 2.0 | 1% | 2% |
| Comparative Example | 8.5 | 10% | 8% |

It is understood from Table 2 that the magnetic tapes of the Actual Example were lower in the number of dropouts, the incidence of audio level fluctuations, and the incidence of clinging of magnetic grains to the head compared with the tapes of the Comparative Example.

What is claimed is:

1. A method for manufacturing a magnetic tape, comprising the steps of:
   providing a source tape having a magnetic recording layer formed thereon;
   slivering said source tape to produce individual tapes of a final product width;
   smoothing obverse and reverse surfaces of said individual tapes; and
   winding said individual magnetic tapes after they have been smoothed.

2. The method for manufacturing a magnetic tape of claim 1, wherein said step of winding said individual magnetic tapes comprises winding said individual magnetic tapes onto rolls alternately displaced from one another.

3. The method for manufacturing a magnetic tape of claim 1, wherein said step of smoothing comprises providing a calendaring unit with a pair of work rolls in contact with said obverse and reverse surfaces, providing a pair of backup rolls, and applying pressure by the pair of backup rolls applying pressure on said work rolls.

4. The method for manufacturing a magnetic tape of claim 3, further comprising the steps of heating said work rolls.

5. The method for manufacturing a magnetic tape of claim 1, wherein said step of smoothing comprises providing a calendaring unit with a single pair of rolls.

6. The method for manufacturing a magnetic tape of claim 5, wherein said single pair of rolls are metal rolls.

7. The method for manufacturing a magnetic tape of claim 5, wherein said single pair of rolls are ceramic rolls.

8. The method for manufacturing a magnetic tape of claim 1, wherein said step of smoothing comprises providing a calendaring unit with a plurality of metal and elastic rolls and spacer rolls, alternately stacking said metal and elastic rolls, and disposed said spacer rolls laterally of said metal and elastic rolls.

* * * * *